Figure 1:
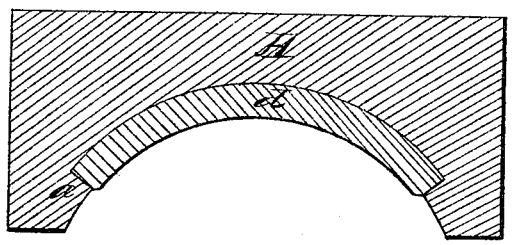
Figure 1:
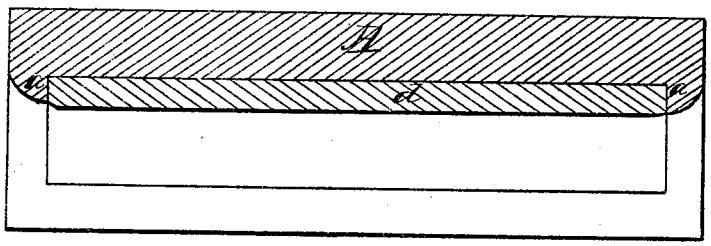
Figure 1:
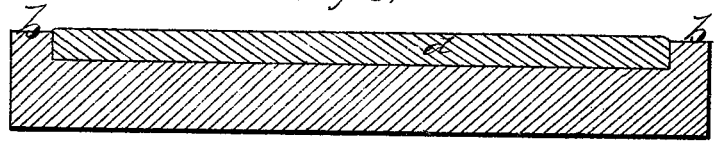

E. Campbell,
Journal Box.

Nº 13,454.    Patented Aug. 21, 1855

Fig 2,

Fig 3,

UNITED STATES PATENT OFFICE.

EDW. CAMPBELL, OF COLUMBUS, OHIO.

GLASS JOURNAL-BOX.

Specification forming part of Letters Patent No. 13,454, dated August 21, 1855; Reissued August 25, 1857, No. 485.

*To all whom it may concern:*

Be it known that I, EDWARD CAMPBELL, of Columbus, in the county of Franklin and State of Ohio, have invented a new and Improved Journal-Box Composed of Iron and Glass; and I do hereby declare that the following is a full and exact description thereof, reference being had to the accompanying drawings, making a part of this specification.

I construct my improved journal box in the following manner, viz: I form the back A, of the box of cast iron, with a shallow recess for the reception of the anti-friction glass lining $d$. The said recess in the back A, may be entirely inclosed by the side lips $a, a,$ and the end lips $b, b,$ or the said end lips may be omitted. The surface of the recess in the said iron back, must first be brightened, or the natural surface of the iron within said recess must be removed by some other process. After that has been accomplished, the said iron portion of the box must be heated to the temperature indicated by a red color; and while in that state, the plastic glass must be pressed into its recess, and then it must be immediately placed in an annealing oven, and subjected to a thorough annealing process. After being removed from the annealing oven it will be found that there is so perfect a union between the surfaces of the iron and glass portions of my improved journal box, that a heavy blow upon the surface of the glass lining, will not produce a fracture. Before my improved journal boxes are subjected to use however, their lining surfaces should be ground out so that they will truly and smoothly fit the surfaces of the journals that are to run in them.

I wish it to be understood that I do not claim as my invention the union of glass and iron, while the former is in a plastic state and the latter at a red heat, by pressure to produce a welding of the two; but What I do claim and desire to secure by Letters Patent as a new manufacture is—

A journal box composed of an iron body and an anti-friction lining surface of glass, when the said glass lining is combined with its iron back substantially as herein set forth.

The above specification of my improved journal box, composed of glass and iron, signed and witnessed this twenty-sixth day of June, A. D. 1855.

EDWD. CAMPBELL.

Witnesses:
GEO. W. ADAMS,
Z. C. ROBBINS.

[FIRST PRINTED 1912.]